United States Patent [19]

Kobayashi

[11] Patent Number: 4,697,297
[45] Date of Patent: Oct. 6, 1987

[54] WINDSHIELD WIPER
[75] Inventor: Toshio Kobayashi, Hadano, Japan
[73] Assignee: Nissan Motor Co., Ltd., Japan
[21] Appl. No.: 795,922
[22] Filed: Nov. 7, 1985
[30] Foreign Application Priority Data Nov. 13, 1984 [JP] Japan ................. 59-237558

[51] Int. Cl.⁴ .............................................. B60S 1/40
[52] U.S. Cl. .............................. 15/250.23; 15/250.32
[58] Field of Search ........... 15/250.23, 250.32, 250.21, 15/250.35

[56] References Cited

U.S. PATENT DOCUMENTS 1,571,516  2/1926  Folberth et al. .
3,418,678  12/1968 Deibel et al. ..................... 15/250.23
3,852,845  12/1974 Quinlan et al. ................... 15/250.23
3,893,204  7/1975  Holb ................................. 15/250.23

FOREIGN PATENT DOCUMENTS 2,250,509  12/1978 Fed. Rep. of Germany .
G8217087.8 12/1982 Fed. Rep. of Germany .
56-93348   7/1981  Japan .
1475097    6/1977  United Kingdom .
2108828    5/1983  United Kingdom .

Primary Examiner—Peter Feldman
Attorney, Agent, or Firm—Lane and Aitken

[57] ABSTRACT

A windshield wiper consists of a bridge member having first and second pivot sections to which main and auxiliary arms swingingly drivable are pivotabley connected, respectively. Additionally, an installation section to which a wiper blade is to be securely connected is formed integral with the bridge member and has a base portion through which the installation section protrudes from the bridge member. The base portion is positioned spaced from a plane connecting the bridge member first and second pivot sections, and the installation section extends beyond the plane, thereby effectively transmitting the depression force of both the arms to the wiper blade while reducing connecting sections which will render the wiper rickety.

15 Claims, 12 Drawing Figures

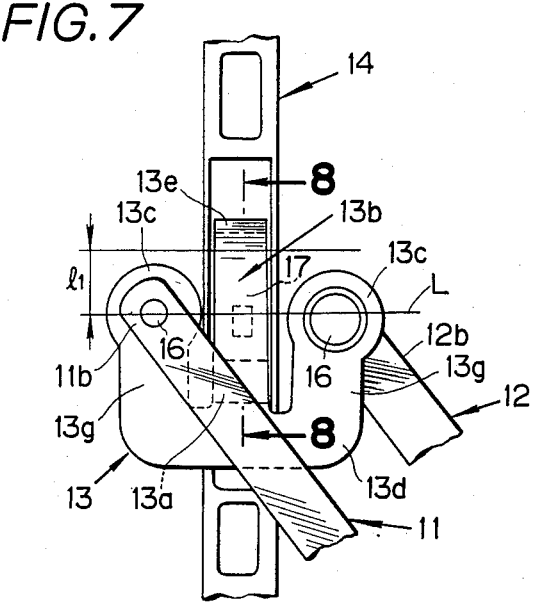
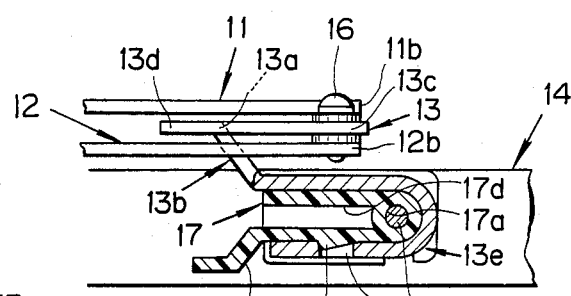
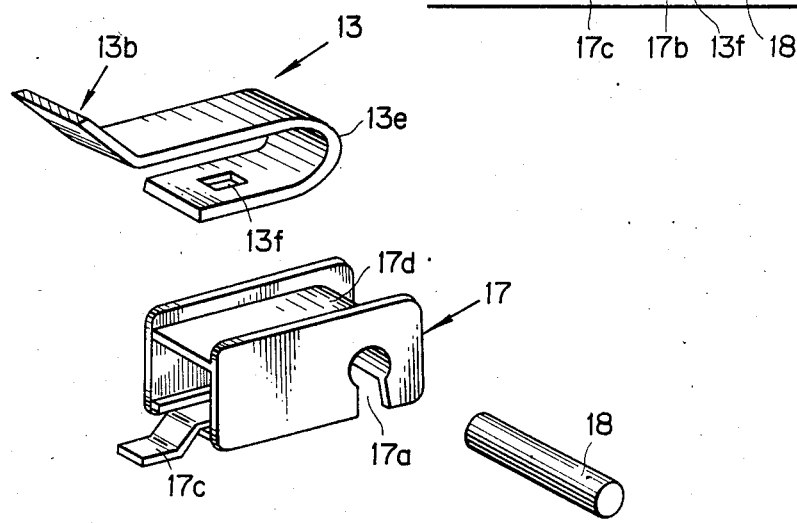

WINDSHIELD WIPER

BACKGROUND OF THE INVENTION

1. Field of the Invention

This invention relates generally to windshield wipers used in automotive vehicles and in ships, and more particularly to an improvement in so-called four-joint link type windshield wipers for the purpose of preventing the windshield wipers from becoming rickety.

2. Description of the Prior Art

A variety of windshield wipers have been used and proposed in the field of automotive vehicles and ships. Of these windshield wipers, there are so-called four-joint link type windshield wipers one of which is configured as follows: two swingingly drivable parallel arms are connected to a bridge member which is provided with an installation holder. Additionally, the installation holder is provided with a pin on which a wiper blade is rotatably mounted. The thus configurated windshield wipers have many connecting portions which will cause the wipers to become rickety, thereby generating chattering noise while deteriorating the wiping performance thereof.

SUMMARY OF THE INVENTION

A windshield wiper of the present invention consists of a bridge member through which swingingly drivable main and auxiliary arms are connected and which is adapted to drivingly connect both the arms to a wiper blade. The bridge member has first and second pivot sections to which the main and auxiliary arms are pivotally connected, respectively, in such a manner that the main and auxiliary arms are nearly parallel with each other. Additionally, an installation section to which the wiper blade is installed is formed integral with the bridge member and has a base portion through which the installation section protrudes from the bridge member. The base portion is positioned separate from a line connecting the bridge member first and second pivot sections, while the installation section extends beyond the above-mentioned line.

Accordingly, transmission of the depression force from both the arms to the wiper blade can be effectively accomplished thereby to improve the wiping performance while reducing the number of connecting sections between the bridge member and the wiper blade thereby to prevent the wiper from becoming rickety.

BRIEF DESCRIPTION OF THE DRAWINGS

The features and advantages of the windshield wiper according to the present invention will be more clearly appreciated from the following description taken in conjunction with the accompanying drawings in which same reference numerals designate corresponding parts and elements, and in which:

FIG. 7 is an enlarged fragmentary view of an essential part of the windshield wiper of FIG. 6;

FIG. 8 is a cross-sectional view taken in the direction of arrows substantially along the line 8—8 of FIG. 7;

FIG. 9 is an exploded perspective view showing a fragmentary bridge member hook portion and a support spring structure of the windshield wiper of FIG. 6;

DETAILED DESCRIPTION OF THE INVENTION

Figure 1:
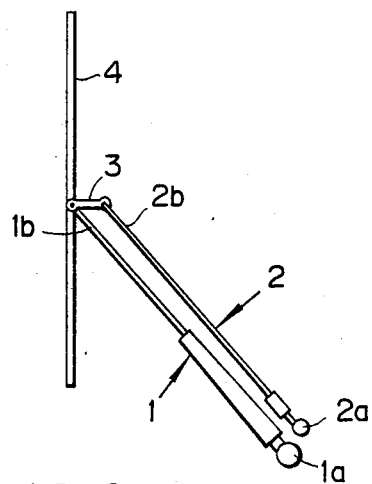
FIG. 1 is a front view of a conventional windshield wiper of a so-called four-joint link type.
Figure 2:
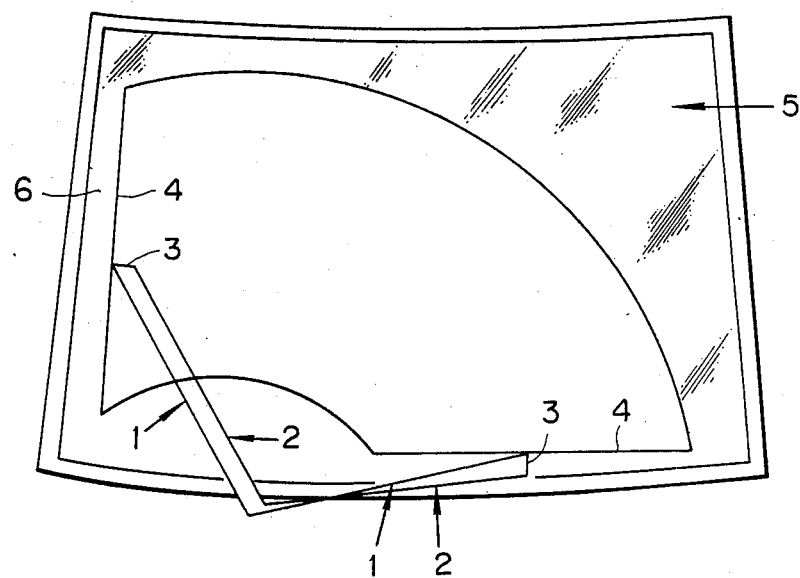
FIG. 2 is a schematic illustration showing a wiping pattern of the windshield wiper of FIG. 1.
Figure 3:
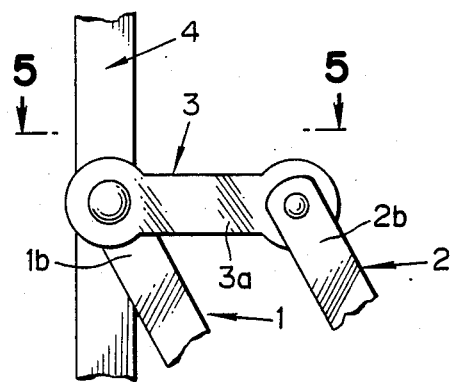
FIG. 3 is an enlarged fragmentary front view of an essential part of the windshield wiper of FIG. 1.
Figure 4:
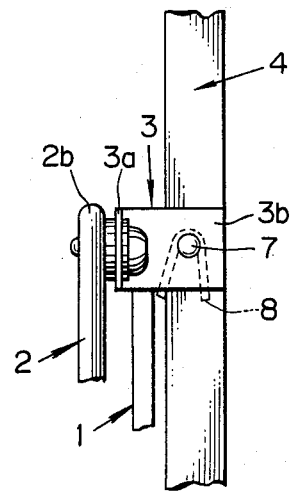
FIG. 4 is a right-side view of the essential part of FIG. 3.

To facilitate understanding the present invention, a brief reference will be made to a conventional so-called four-joint link type windshield wiper, depicted in FIGS. 1 to 5. Referring to FIGS. 1 to 5, the windshield wiper consists of main and auxiliary arms 1, 2 which are formed with base end sections 1a and 2a, respectively, which are pivotally connected to pivot shafts (not shown), respectively. The tip end sections 1b, 2b of the respective arms 1, 2 are connected with each other by means of a bridge member 3 so that the main and auxiliary arms 1, 2 are disposed parallel with each other. Additionally, a wiper blade 4 is movably installed to the bridge member 3, thereby wiping a windshield 5 with a wiping pattern as shown in FIG. 2.

The bridge member 3 includes a connecting plate 3a by which both the arms 1, 2 are connected, and an installation holder 3b to which the wiper blade 4 is installed. The tip end sections of the respective arms 1, 2 are pivotally attached to the opposite end sections of the connecting plate 3a. The installation holder 3b is securely fixed to the central section of the connecting plate 3a, in which the wiper blade 4 is rotatably installed through a pin 7 to the holder 3b. The pin 7 is adapted to be prevented from getting out from the holder 3b by means of an engaging member 8.

Figure 5:
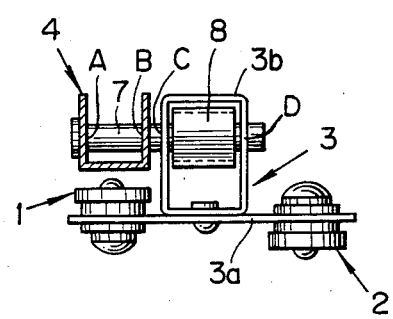
FIG. 5 is a cross-sectional view taken in the direction of arrows substantially along the line 5—5 of FIG. 3.
Figure 6:
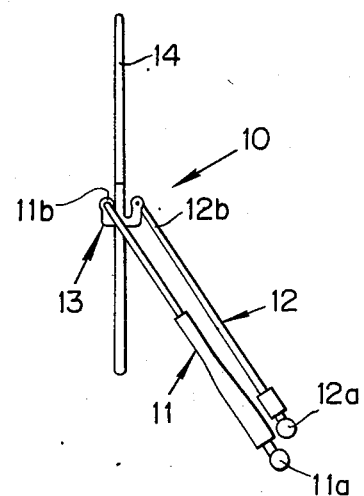
FIG. 6 is a front view of an embodiment of a windshield wiper according to the present invention, of the four-joint link type.
Figure 10:
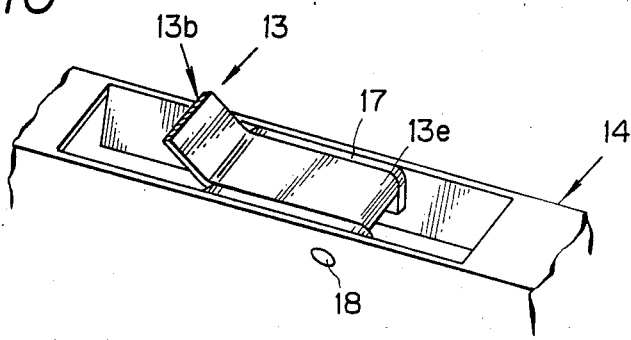
FIG. 10 is a fragmentary perspective view showing a state where a bridge member hook portion of FIG. 9 is securely installed in position.

However, the following drawbacks have been encountered in the thus arranged conventional four-joint link type windshield wiper: since the wiper blade 4 is installed movably through the pin 7, there exist a plurality of connecting sections A, B, C and D as shown in FIG. 5 each of the connecting sections having a play between members contactable with each other. Therefore, they are liable to become rickety, thereby generating chattering noise while lowering wiping performance.

In view of the above description of the conventional four-joint link type windshield wiper, reference is now made to FIGS. 6 to 10 wherein a preferred embodiment of a four-joint link type windshield wiper 10 of the present invention is illustrated. The windshield wiper 10 comprises main and auxiliary arms 11, 12 which are respectively formed with base end sections 11a, 12a which are installed on a pair of pivot shafts (not shown), respectively. Additionally, the main and auxiliary arms 11, 12 are respectively formed with tip end sections 11b, 12b which are pivotally connected to a bridge member 13 in such a manner that the arms 11, 12 are nearly parallel with each other. Additionally, a wiper blade 14 is installed on the bridge member 13.

More specifically, the bridge member 13 is generally C-shaped to function to connect both the arms 11, 12 and integrally formed with an installation section 13b to which the wiper blade 14 is to be installed. The bridge member 13 may be V-shaped. The bridge member 13 is formed at its opposite end parts with pivot sections 13c to which the tip end sections 11b, 12b of both the arms 11, 12 are pivotally connected through screws 16 or the like, respectively. The installation section 13b is formed bent and protrudes from the bridge member 13 through a base portion 13a, so that the bridge member 13 has a horizontal elongate intermediate section 13d as the bridge member 13 is shown in FIG. 7, to which two vertical leg sections 13g are integral. The pivot sections 13c are integral with the vertical leg sections 13g, respectively. It is to be noted that the base portion 13a of the installation is separate or spaced from a straight line L connecting the centers of the pivot sections 13c. The line L connects the center axes of screws 16. The installation section 13b extends from the base portion 13a beyond the line L in such a manner as to pass through a space between both the pivot sections 13c as viewed from the direction perpendicular to the surface of the bridge member intermediate section 13d as shown in FIG. 7. The installation section 13b is formed at its tip end part with a U-shaped hook portion 13e as shown in FIGS. 8 and 9. It is to be noted that the U-shaped hook portion 13e is separate or spaced from a plane (not shown) on which the intermediate section 13d and the pivot sections 13c lie, as shown in FIG. 8. The hook portion 13e is formed near its tip end with an engagement hole 13f.

As shown in FIGS. 8 and 9, the wiper blade 14 is provided with a support spring structure 17 made of a plastic material. The support spring structure 17 includes a support section 17d formed with a fitting opening 17a opened at its bottom. Additionally, the support section 17d has a spring piece section 17c having an engagement projection 17b. The support spring structure 17 is rotatably mounted at its fitting opening 17a on the pin 18 securely fixed to the wiper blade 14 so as to be installed on the wiper blade 14. The hook portion 13e of the installation section 13b is installed on the support spring structure 17 upon the engagement projection 17b of the support spring structure spring piece section 17c being inserted into the engagement hole 13f of the installation section 13b to be engaged with each other, thus connecting both the arms 11, 12 with the wiper blade 14 through the bridge member 13 and the like.

With the thus arranged windshield wiper 10, the hook portion 13e of the installation section 13b is directly connected to the wiper blade 14 without using a pin as in the above-mentioned conventional windshield wiper, for the purpose of the installing the wiper blade 14 on the bridge member 13. Accordingly, the number of connecting sections between the bridge member and the wiper blade is smaller, i.e., elements for rendering the windshield wiper rickety are smaller, so that the windshield wiper is prevented from becoming rickety, thereby to preventing generation of chattering noise. Furthermore, the bridge member 13 is integrally formed with the installation section 13b, thereby facilitating the production of the windshield wiper.

In addition, the intermediate section 13d of the bridge member 13 is formed bent so as to provide the base portion 13a of the installation section 13b, and therefore the distance $l_1$ (indicated in FIG. 7) between the installation section hook portion 13e and the tip end sections of both the arms 11, 12 can be set smaller. As a result, the depression force of both the arms 11, 12 can be effectively transmitted to the wiper blade 14, thus making stable the wiping performance of the wiper blade 14. It is possible to make the distance $l_1$ further smaller by extremely or largely bending the installation section 13b from the base portion 13a relative to the bridge member 13. It will be understood that, in case where the distance $l_1$ is larger, the depression force of the arms 11, 12 on the wiper blade 14 becomes weaker, thereby deteriorating the wiping performance.

In the event that wiper blade 14 has deteriorated with the passage of time, the wiper blade 14 is easily replaced with a new one upon removing the hook portion 13e from its position by deforming the spring piece section 17c of the support spring structure 17 to cause the engagement projection 17b to get out of the engagement hole 13f of the hook portion 13e.

Figure 11:
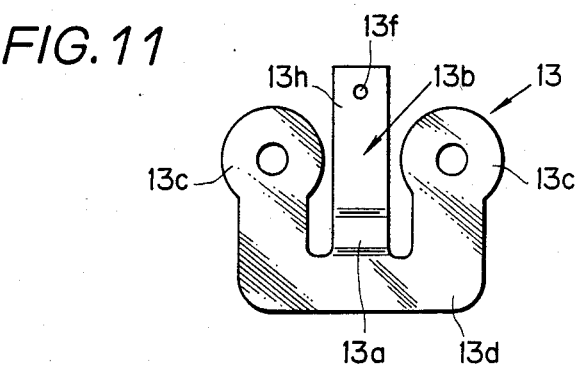
FIG. 11 is a front view of a bridge member forming part of another embodiment of the windshield wiper according to the present invention.
Figure 12:
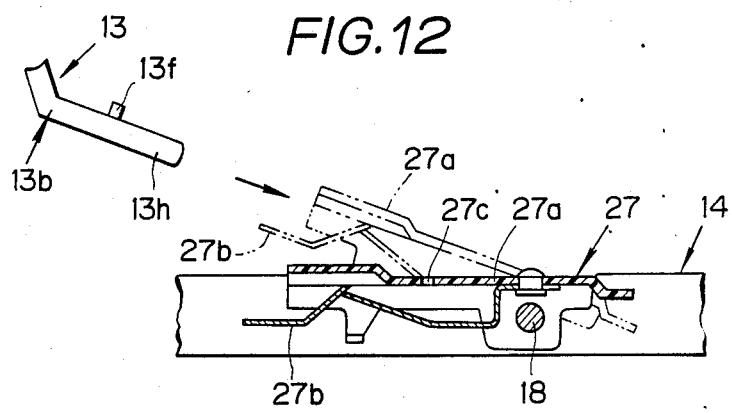
FIG. 12 is a cross-sectional view showing a bridge member straight portion and a support spring structure of a wiper blade in the windshield wiper of FIG. 11.

FIGS. 11 and 12 show another embodiment of the windshield wiper in accordance with the present invention.

This embodiment is similar to the embodiment of FIGS. 6 to 10 with the exception that the installation section 13b includes a straight portion 13h which elongates from the bridge member intermediate section 13d through the base portion 13a in place of the hook portion 13e. The straight portion 13h is formed with an engagement pin 13f protruding from the surface thereof. In this connection, the wiper blade 14 is provided with a support spring structure 27 in place of the support spring structure 17 of the embodiment of FIGS. 6 to 10. The support spring structure 27 is rotatably installed through a pin 18 to the wiper blade 14 and includes an upper wall plate 27a and a biasing spring plate 27b. The installation section 13e straight portion 13h is inserted between the upper wall plate 27a and the biasing spring plate 27b in which the engagement pin 13f engages with an engagement hole 27c formed in the upper wall plate 27a while the installation section 13e is biased upwardly by the spring plate 27b, so that the bridge member 13 is securely installed on the support spring structure 27.

Thus, also in this embodiment, the bridge member 13 is integrally formed with the installation section 13b and formed into the shape similar to the embodiment of FIGS. 6 to 10, thereby obtaining the same effect as in the embodiment of FIGS. 6 to 10. It will be understood that the remainder of the configuration of this embodiment is the same as in the embodiment of FIGS. 6 to 10 and accordingly the explanation thereof is omitted for the purpose of simplicity of illustration.

What is claimed is:
1. A windshield wiper comprising:
a wiper blade;
main and auxiliary arms connected to said wiper blade and swingingly movable upon being driven;
a bridge member having first and second pivot sections to which said main and auxiliary arms are pivotally connected at their first end sections, respectively, so that said main and auxiliary arms are in nearly parallel relationship with each other, said pivot sections defining pivot axes; and
an installation section to which said wiper blade is installed, said installation section being integral with said bridge member and having a base portion through which said installation section protrudes from said bridge member, said base portion being spaced from a plane passing through said bridge member first and second pivot sections and containing the pivot axes, said base portion being located on a first side of said plane, said installation section extending beyond said plane to a second side of said plane, and said first and second sides being opposite to each other with respect to said plane.

2. A windshield wiper as claimed in claim 1, wherein a major part of said installation section is substantially parallel with a major part of said bridge member and located spaced from a plane on which said bridge member major part lies.

3. A windshield wiper as claimed in claim 1, wherein said bridge member includes an elongate intermediate section having first and second ends, and first and second elongate leg sections which are respectively integral with said intermediate section at said first and second ends and oriented perpendicular relative to said intermediate section, said first and second pivot sections being integral with said first and second leg sections, respectively.

4. A windshield wiper as claimed in claim 3, wherein the base portion of said installation section is integral with said intermediate section at a central portion.

5. A windshield wiper as claimed in claim 1, wherein the first end sections of said main and auxiliary arms are pivotally connected to the first and second pivot sections of said bridge member through first and second pivot members, respectively.

6. A windshield wiper as claimed in claim 1, wherein said installation section is formed with a hook portion having a U-shaped cross-section, said hook section being detachably connected to said wiper blade.

7. A windshield wiper as claimed in claim 6, wherein said hook portion is located substantially parallel with a plane on which a major part of said bridge member lies.

8. A windshield wiper as claimed in claim 6, wherein said wiper blade is provided with a support spring structure made of a material having spring characteristics, said support spring structure having a support section on which said hook section is securely supportable, and means for detachably fixing said installation section hook portion to said support section, said support spring structure being pivotally mounted on said wiper blade.

9. A windshield wiper as claimed in claim 8, wherein said detachably fixing means includes means for defining an engagement hole in said installation section hook section, said engagement hole being engageable with an engagement projection formed in said support spring structure support section.

10. A windshield wiper as claimed in claim 9, wherein said installation section hook portion has first and second plates which are parallel and spaced from each other and integrally connected with each other, said first plate being formed with said engagement hole, and said support spring structure support section has first and second plates which are parallel and spaced from each other and integrally connected with each other, said support section first and second plates being connectable with said hook section first and second plates, respectively, said support section first plate being formed with said engagement projection.

11. A windshield wiper as claimed in claim 1, wherein said installation section is formed with a straight portion which is detachably connected to said wiper blade.

12. A windshield wiper as claimed in claim 11, wherein said straight portion is located substantially parallel with a plane on which a major part of said bridge member lies.

13. A windshield wiper as claimed in claim 11, wherein said wiper blade is provided with a support spring structure including a wall plate member, and a spring plate member secured to said wall plate member, said installation section straight portion being insertable between said wall plate member and said spring plate member, and means for detachably fixing said installation straight portion to said wall plate member, said support spring structure being pivotally mounted on said wiper blade.

14. A windshield wiper as claimed in claim 13, wherein said detachably fixing means includes an engagement pin formed on said installation section straight portion which is engageable with an engagement hole formed in said wall plate member.

15. A windshield wiper comprising:
a wiper blade;
main and auxiliary arms connected to said wiper blade and swingingly movable upon being driven;
a bridge member having first and second pivot sections to which said main and auxiliary arms are pivotally connected at their first end sections, respectively, so that said main and auxiliary arms are in nearly parallel relationship with each other, said pivot sections defining pivot axes, said bridge member including an elongate intermediate section having first and second ends, and first and second elongate leg sections which are integral with said intermediate section at said first and second ends, respectively, and oriented perpendicular relative to said intermediate section, said first and second pivot sections being integral with said first and second vertical sections, respectively, said first and second elongate leg sections being generally parallel with each other and extending in the same direction; and
an installation section on which said wiper blade is installed, said installation section being integral with said bridge member and having a base portion through which said installation section protrudes from said bridge member, said base portion being space from a plane passing through said bridge member first and second pivot sections and containing the pivot axes, said base portion being located on a first side of said plane, said installation section extending beyond said plane to a second side of said plane, said first and second sides being opposite to each other with respect to said plane, said installation section being integral at its base portion with said bridge member intermediate section, and said base portion being located between said bridge member first and second leg sections.

* * * * *